US009162910B2

(12) United States Patent
Post et al.

(10) Patent No.: US 9,162,910 B2
(45) Date of Patent: Oct. 20, 2015

(54) FLUID TREATMENT SYSTEM

(75) Inventors: James Christopher Post, Mars, PA (US); Randy Hiebert, Butte, MT (US); Robert Hyatt, Butte, MT (US)

(73) Assignee: ALLEGHENY-SINGER RESEARCH INSTITUTE, Pittsburgh, PA (US)

(*) Notice: Subject to any disclaimer, the term of this patent is extended or adjusted under 35 U.S.C. 154(b) by 518 days.

(21) Appl. No.: 13/546,391

(22) Filed: Jul. 11, 2012

(65) Prior Publication Data

US 2013/0112616 A1    May 9, 2013

Related U.S. Application Data

(60) Provisional application No. 61/506,417, filed on Jul. 11, 2011.

(51) Int. Cl.
| | |
|---|---|
| C02F 3/30 | (2006.01) |
| C02F 3/34 | (2006.01) |
| C02F 9/00 | (2006.01) |
| C02F 3/12 | (2006.01) |
| C02F 103/10 | (2006.01) |

(52) U.S. Cl.
CPC ............. *C02F 9/00* (2013.01); *C02F 3/1215* (2013.01); *C02F 3/1221* (2013.01); *C02F 3/1268* (2013.01); *C02F 3/30* (2013.01); *C02F 3/34* (2013.01); *C02F 2103/10* (2013.01); *Y02W 10/15* (2015.05); *Y02W 10/37* (2015.05)

(58) Field of Classification Search
CPC ........ C02F 9/00; C02F 3/1215; C02F 3/1221; C02F 3/1268; C02F 2103/10; C02F 3/30; C02F 3/302; C02F 3/34; Y02W 10/37; Y02W 10/15

USPC ........ 210/605, 614, 615, 616, 630, 631, 912, 210/913, 914
See application file for complete search history.

(56) References Cited

U.S. PATENT DOCUMENTS

| | | | |
|---|---|---|---|
| 4,124,501 A | 11/1978 | Yen et al. | |
| 4,839,052 A | 6/1989 | Maree | |
| 5,116,506 A * | 5/1992 | Williamson et al. | 210/610 |
| 5,232,586 A | 8/1993 | Malone | |
| 5,314,806 A * | 5/1994 | Morton et al. | 435/41 |
| 5,510,032 A | 4/1996 | Vail et al. | |
| 5,597,484 A | 1/1997 | Tolley et al. | |
| 5,908,555 A | 6/1999 | Reinsel et al. | |
| 6,123,840 A | 9/2000 | Suzuki et al. | |
| 6,183,644 B1 | 2/2001 | Adams et al. | |

(Continued)

FOREIGN PATENT DOCUMENTS

JP    54-107153 A  *  8/1979

*Primary Examiner* — Fred Prince
(74) *Attorney, Agent, or Firm* — Fox Rothschild LLP (57) ABSTRACT

A fluid treatment system includes a fluid source, at least one anaerobic reactor vessel, and at least one aerobic reactor vessel. The anaerobic reactor vessel contains retaining a set of retaining structures that are at least partially coated with an anaerobic biofilm. The aerobic reactor vessel contains an aerobic biofilm. When fluid from the fluid source is exposed to the anaerobic biofilm, the anaerobic biofilm removes one or more metal substances from the fluid. When the fluid is exposed to the aerobic biofilm, the aerobic biofilm may cause organic materials in the fluid to metabolize. The system also may include a precipitation reactor that separates divalent metals from the fluid, a settling facility that forms a slurry comprising separated metals, and a neutralization reactor that modifies the fluid to a substantially neutral pH.

19 Claims, 4 Drawing Sheets

(56) References Cited

U.S. PATENT DOCUMENTS

| | | |
|---|---|---|
| 6,630,067 B2 | 10/2003 | Shieh et al. |
| 6,761,823 B2 | 7/2004 | Maddux et al. |
| 7,326,344 B2 | 2/2008 | Cotoras Tadic et al. |
| 7,481,935 B2 | 1/2009 | Olivier |
| 7,550,087 B2 | 6/2009 | Peeters et al. |
| 7,563,371 B2 * | 7/2009 | McCune-Sanders et al. ... 210/603 |
| 7,790,034 B2 | 9/2010 | Peeters et al. |
| 7,794,598 B2 | 9/2010 | Zaitsev |
| 7,862,711 B2 | 1/2011 | Han |
| 7,988,856 B2 | 8/2011 | Tatarko |
| 2003/0062306 A1 | 4/2003 | Perriello |
| 2003/0203476 A1 | 10/2003 | Fliermans |
| 2005/0011829 A1 * | 1/2005 | Dong et al. .................. 210/603 |
| 2007/0045181 A1 * | 3/2007 | Brase ............................ 210/605 |
| 2007/0114174 A1 * | 5/2007 | Peeters et al. ................ 210/605 |
| 2008/0073268 A1 * | 3/2008 | Cort ............................... 210/609 |
| 2008/0237141 A1 | 10/2008 | Kerfoot |
| 2008/0257820 A1 | 10/2008 | Peeters et al. |
| 2010/0319913 A1 | 12/2010 | Post et al. |
| 2011/0006000 A1 | 1/2011 | Post et al. |
| 2012/0006744 A1 | 1/2012 | Phattaranawik et al. |
| 2012/0067818 A1 | 3/2012 | Westrum et al. |

* cited by examiner

FLUID TREATMENT SYSTEM

RELATED APPLICATIONS AND CLAIM OF PRIORITY

This patent application claims priority to U.S. Provisional Patent Application No. 61/506,417, filed Jul. 11, 2011, the disclosure of which is incorporated herein by reference in its entirety

BACKGROUND

Hydraulic fracturing is a process whereby fluid under pressure is used to fracture open the shale, such as that in the Marcellus Shale, to greatly enhance the recovery of natural gas or oil. The fluid used in hydraulic fracturing (often referred to as "fracture water," "frac water" or "frac fluid") is primarily water. Other components of frac fluid may include proppant, hydrochloric acid, glutaraldehyde as a biocide, sodium chloride, ethylene glycol and various components for scale inhibitor and iron control. The exact composition of frac fluid may vary.

Disposal of frac fluid that is returned from a well (flowback) is one of the biggest challenges facing the recovery of natural gas from shale. Each well can produce millions of gallons of flowback water because after the fracturing process a large percentage of the water used is pumped back up the well in order to produce the natural gas. Ground water can be protected by properly casing the well, but the problem lies in the safe disposal of the flowback water which can contain arsenic, manganese, cobalt, chromium, lead, various other metals and organic substances, as well as compounds added by the manufacturer.

Current disposal systems are unsatisfactory for environmental or economic reasons and do not always provide for the recycling of frac fluid. These disposal methods include deep well injection, or trucking the waste to industrial or municipal water treatment facilities.

This disclosure describes a novel system for treating a fluid, such as industrial wastewater or frac flowback fluid that is contaminated with heavy metals.

SUMMARY

In one aspect, a fluid treatment system includes a fluid source, at least one anaerobic reactor vessel, and at least one aerobic reactor vessel. The anaerobic reactor vessel contains retaining a set of retaining structures that are at least partially coated with an anaerobic biofilm. The aerobic reactor vessel contains an aerobic biofilm. When fluid from the fluid source is exposed to the anaerobic biofilm, the anaerobic biofilm removes one or more metal substances from the fluid. When the fluid is exposed to the aerobic biofilm, the aerobic biofilm may cause organic materials in the fluid to metabolize.

In certain embodiments, the system may include a precipitation reactor including a vessel and a reagent in which the vessel is configured to receive the fluid so that the reagent may separate one or more divalent metals from the fluid.

In certain embodiments, the precipitation reactor is configured to be positioned downstream of the fluid source and upstream of the anaerobic reactor.

In certain embodiments, the precipitation reactor is configured to be positioned downstream of the anaerobic reactor and upstream of the aerobic reactor.

In certain embodiments, the precipitation reactor is configured to be positioned upstream of the anaerobic reactor and the aerobic reactor.

In certain embodiments, the system further includes a vehicle that is configured to transport the aerobic reactor, the precipitation reactor, and the anaerobic reactor and to enable the system to be operated while positioned on the vehicle.

In certain embodiments, the system further includes a settling facility that is configured to receive the fluid from the anaerobic reactor and separate metals from the fluid before the fluid is passed to the aerobic reactor.

In certain embodiments, the system further includes a settling facility that is configured to receive the fluid from the precipitation reactor and separate metals from the fluid before the fluid is passed to the anaerobic reactor.

In certain embodiments, the system further includes a neutralization reactor configured to be in fluid connection with the intake port of the aerobic reactor, the neutralization reactor including a vessel and a reagent that, upon receipt of the fluid, modifies the fluid to a substantially neutral pH.

In certain embodiments, the system further includes a neutralization reactor configured to be in fluid connection with the intake port of the anaerobic reactor, the neutralization reactor including a vessel and a reagent that, upon receipt of the fluid, modifies the fluid to a substantially neutral pH.

In certain embodiments, the anaerobic reactor includes a plurality of columns connected to each other in series, and the anaerobic biofilm comprises one or more of the following: *Deinococcus geothermalis, Deinococcus radiodurans.*

In certain embodiments, the anaerobic reactor includes a plurality of columns connected to each other in parallel, and the anaerobic biofilm includes one or more of the following: *Deinococcus geothermalis, Deinococcus radiodurans.*

In another aspect, a fluid treatment system includes a fluid source that supplies a fluid, a precipitation reactor including a vessel and a reagent, the vessel is configured to receive the fluid so that the reagent may separate one or more divalent metals from the fluid, an anaerobic reactor including an intake port that is fluidly connected to the fluid source, an outlet port, and a plurality of biofilm retaining structures that are at least partially coated with an anaerobic biofilm, an aerobic reactor including an intake port that is fluidly connected with the outlet port of the anaerobic reactor, the aerobic reactor also including an aerobic biofilm, a settling facility that is configured to receive the fluid from the anaerobic reactor and separate metals from the fluid before the fluid is passed to the aerobic reactor, and a neutralization reactor configured to be in fluid connection with the intake port of the aerobic reactor, the neutralization reactor including a vessel and a reagent that, upon receipt of the fluid, modifies the fluid to a substantially neutral pH.

In certain embodiments, the system further includes a vehicle that is configured to transport the aerobic reactor, the precipitation reactor, and the anaerobic reactor and to enable the system to be operated while positioned on the vehicle.

In certain embodiments, the anaerobic reactor includes a plurality of columns, each of which contains the anaerobic biofilm, which includes one or more of the following: *Deinococcus geothermalis, Deinococcus radiodurans*, and the aerobic reactor includes an oxygen source and a nutrient source.

In a further aspect, a fluid treatment system includes a fluid source that supplies a fluid, a precipitation reactor including a vessel and a reagent, the vessel is configured to receive the fluid so that the reagent may separate one or more divalent metals from the fluid, a settling facility that is configured to receive the fluid from the precipitation reactor and separate metals from the fluid, a neutralization reactor that is configured to be in fluid connection with an intake port of an anaerobic reactor, the neutralization reactor including a vessel and a reagent that, upon receipt of the fluid, modifies the fluid to a substantially neutral pH, the anaerobic reactor is fluidly connected to the neutralization reactor and a plurality of biofilm retaining structures that are at least partially coated with an anaerobic biofilm for the removal of one or more heavy metals, radionuclides, and organic materials from the fluid, and a surge tank that is configured to receive the fluid from the anaerobic reactor and is fluidly connected to an aerobic reactor, the aerobic reactor including an aerobic biofilm for the removal of excess nutrients and one or more organic materials from the fluid.

In certain embodiments, the anaerobic reactor includes a plurality of columns connected in series, each of which contains the anaerobic biofilm, which comprises one or more of the following: *Deinococcus geothermalis, Deinococcus radiodurans*, and the aerobic reactor includes an oxygen source and a nutrient source.

In yet another aspect, a method of treating hydraulic fracturing fluid includes exposing hydraulic fracturing fluid to a reagent in a precipitation reactor to precipitate one or more divalent metals from the fluid, passing the fluid through an anaerobic reactor including a plurality of biofilm retaining structures that are at least partially coated with an anaerobic biofilm that removes one or more metals from the fluid, and passing the fluid through an aerobic reactor including an aerobic biofilm that removes one or more organic materials from the fluid.

In certain embodiments, the method further includes after exposing the fluid to the precipitation reactor, settling the metals from the fluid in a settling facility.

In certain embodiments, the method further includes before passing the fluid through the aerobic reactor, adding reagent that modifies the fluid to a substantially neutral pH in a neutralization reactor.

In certain embodiments, the method further includes before passing the fluid through the anaerobic reactor, adding reagent that modifies the fluid to a substantially neutral pH in a neutralization reactor.

Various advantages of this disclosure will become apparent to those skilled in the art from the following detailed description of the preferred embodiments, when read in light of the accompanying drawings.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to." As used in this document, all claimed numeric terms are to be read as being preceded by the term, "about," which means plus or minus 10% of the numerical value of the number with which it is being used. For example, a claim to "50%" means "about 50%" and encompasses the range of 45%-55%.

As used in this document, the term "fluidly connected" or "in fluid connection" refers to a configuration where two elements are joined by a pipe, tube, trough, conduit, or other structure in which fluid may be transferred from the first element to the second element. The connection may be a direct connection, or it may be an indirect connection through one or more intermediate elements.

This document describes a system that uses bioremediation as a process to remove impurities such as heavy metals from waste fluid, such as frac fluid recovered from shale drilling processes, at or near the site of the fluid's recovery. Bioremediation is any process that uses microorganisms, fungi or plants to return the natural environment altered by contaminants to its original condition. In addition to biological processes, chemical processes are also used.

Figure 1:
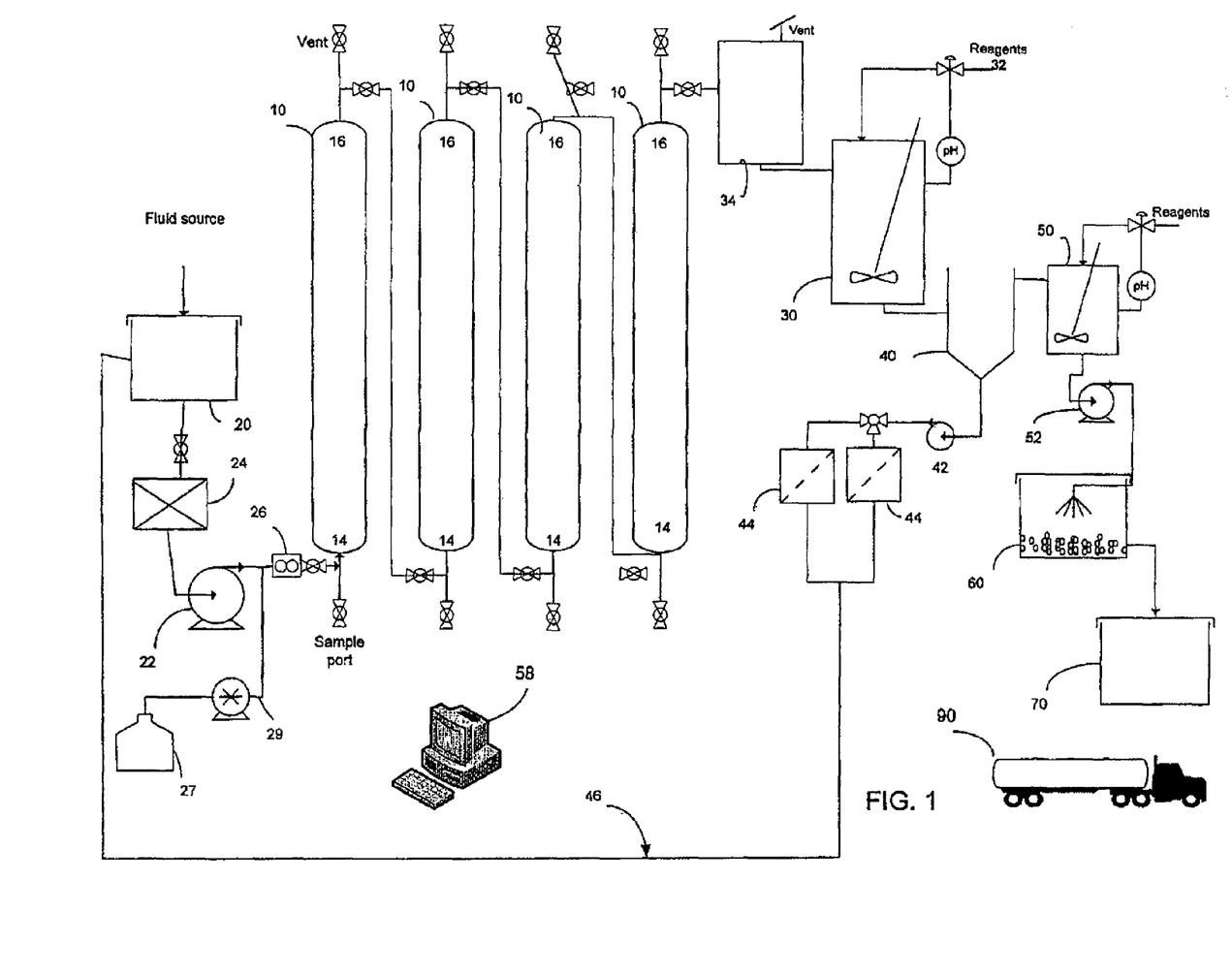
FIG. 1 is a block diagram of a fluid treatment system.

FIG. 1 illustrates components of an embodiment of a fluid treatment system. The system includes one or more anaerobic columns 10 through which fluid may pass to be treated with a biofilm. Although this disclosure uses the term "column" to describe the structure, the structure need not be cylindrical, and the term "column" includes other structures such as box-shaped structures, spheres, or other structures. Each column 10 includes an intake port 14 and an outlet port 16. At least one intake port 14 will be fluidly connected to a fluid source 20 such as a storage tank or pond. Any other intake port 14 also may be fluidly connected to the fluid source 20, or it may be connected to an outlet port 16 of one of the columns. Thus, the columns may be connected in series as shown, or in parallel, or in any combination of series and parallel connection. A series connection may allow the fluid to be more thoroughly treated by passing over the biofilms of multiple columns. If so, in some embodiments, the columns may contain different biofilm strains that are developed to remove different contaminants from the fluid. Alternatively, a parallel connection may permit more rapid treatment, and in parallel configurations each column may include substantially the same type of biofilm.

Optionally, the system may include a pump 22 that directs fluid from the fluid source 20 to the intake port(s) 14 of one or more of the columns. A filter 24 may screen debris from the fluid, and a flow meter 26 may measure the fluid that passes into the columns. The filter may be made of cloth, mesh, paper, or any other suitable material to remove sizable debris from the fluid. Optionally, the pump 22 and flow meter 26 may be electrically connected to a computer processor 58 that serves as a controller that regulates the flow by receiving data from one or more flow rate sensors and sending commands to turn the pump on and off, or adjusting the pump's speed, so that the system remains within a desired flow rate range.

Optionally, the system may include a nutrient source 27 fluidly connected to one or more of the columns in order to supply nutrients to promote biofilm growth. A pump 29, such as a positive displacement pump, may assist in the delivery of nutrients to the columns. The pump 29 may be electrically connected to a controller so that an operator can vary the nutrient delivery rate and/or times. Optionally, one or more parameters of the columns may be monitored so that a user can adjust, or so that a controller can automatically adjust, the flow of nutrients into the columns. The measured parameters are used as an indirect measurement of biofilm growth and overall bioremediation effectiveness. An example of this is to monitor column effluent pH or oxidation reduction potential (ORP) in order to determine whether additional nutrient is needed to enhance biofilm growth. This may be done by including one or more sensors, such as pH sensors, in any of the columns 10 and/or in the piping near the outlet port 16 of a column. The sensors may send data to the controller 58 for processing.

A biofilm is a biological material made of one or more microorganism strains enmeshed in a matrix containing extracellular polymeric substances (EPS) such as DNA, protein and/or carbohydrates, some of which may be produced by the microorganisms. Growth in biofilms allows microorganisms to remain stationary in any porous matrix (i.e., soil or bioreactor media), and to trap nutrients and metals through their water channels. The trapping system derives from the characteristics of the bacterial extracellular polysaccharide (EPS) matrix, which is composed largely of uronic acid (sugar molecules with two carboxylic acid moieties that impart an overall negative charge). Thus, the EPS matrix acts as an ion exchange material that immobilizes positively charged molecules or ions that penetrate through the water channels. In some embodiments, the matrix may make up about 85% by volume of the film, while the microorganism strains may make up about 15% by volume of the film. Other ranges are possible. For example, the matrix may make up about 50% by volume of the film, the matrix may make up about 60% by volume of the film, the matrix may make up about 70% by volume of the film, the matrix may make up about 80% by volume of the film, or the matrix may make up about 90% by volume of the film.

Biofilms remove contaminants from the surrounding aqueous matrix by several mechanisms. These include binding by the EPS matrix, changes to the oxidation-reduction potential (ORP), and direct or indirect metabolic processes. Metal binding removes metals by adsorption to the EPS matrix. Oxidation or reduction of the metal occurs when microorganisms alter the valence state of the dissolved metal, causing it to become less soluble. An example of indirect metal reduction is sulfate-reducing bacteria (SRB) which produce hydrogen sulfide which in turn reacts with certain heavy metals (e.g. copper, zinc) reducing them to insoluble metal sulfides. Several microorganisms are also capable of direct metal reduction. As nutrient sources are oxidized, the heavy metal (e.g. chromium, uranium) is reduced to an insoluble form. Biofilms provide structures to trap radioactive materials and other heavy metals. Biofilms may be encased in a polysaccharide matrix (also known as "slime") that surrounds the microorganisms and, in some embodiments, makes up about 85% of the volume of biofilms. The matrix may include an anionic polymer. Anionic polymers are molecules with an enormous affinity for metals and may be co-polymers of acrylamide with increasing contents of acrylic groups, which give the polymers their negative charges. An example of an anionic polymer includes, but is not limited to, uronic acids such as alginates. Additionally, fully charged matrices can trap negative particles via their bound positively-charged metal ions.

Figure 2:
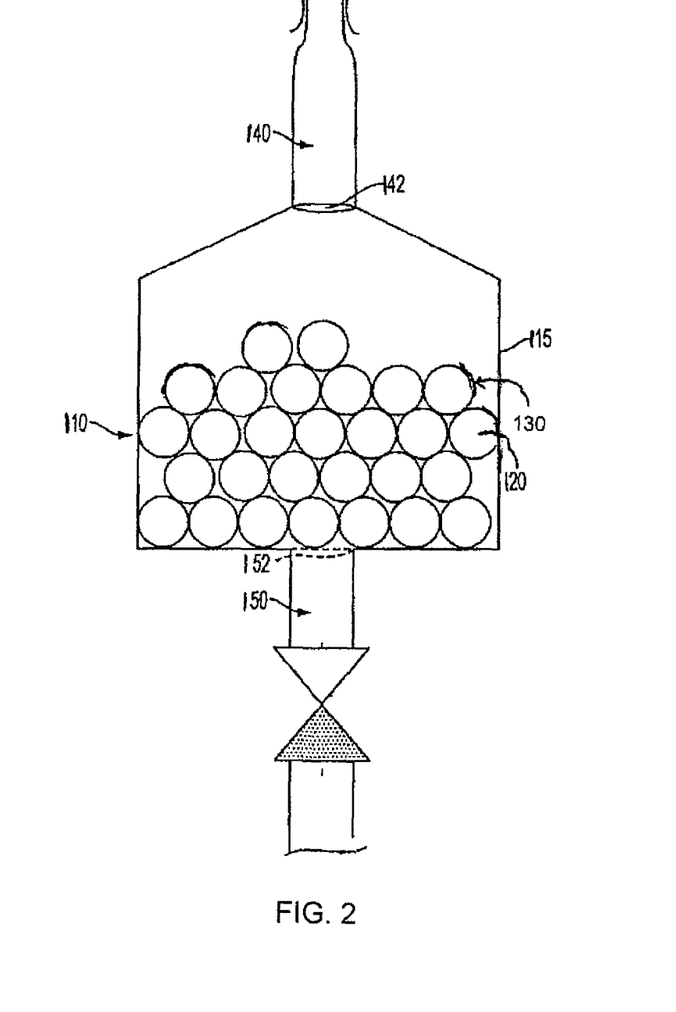
FIG. 2 illustrates a reactor vessel structure.

FIG. 2 illustrates an example of a reactor vessel 110 that may comprise any of the anaerobic columns (element 10 of FIG. 1). The vessel 110 includes a tank structure 115 which may be made of glass, ceramic, plastic, or another material that is resistant to corrosion. An intake opening 142 may be fluidly connected to intake 140 for delivery of fluid into the tank structure. An outlet 150 may be connected to an outlet opening 152 for the transmission of fluid that exits the tank structure. The relative positions of the intake 140 and outlet 150 may be reversed, in which case the direction of flow would also be reversed. The tank structure holds one or more biofilm retaining structures 120 with one or more surfaces that hold an anaerobic biofilm 130. The input tube, output tube, the biofilm retaining structure and the biofilm are configured so that the fracture fluid is uniformly exposed to the biofilm while in the vessel.

The biofilm retaining structures are any structures that provide surface area on which the biofilm may attach and grow. The structures may be glass, ceramic, plastic, or an organic material. Examples include saddle-shaped ceramic structures, glass beads, other structures shaped as spheres, cubes or other shapes, organic material such as nut shells, or combinations of any of these items.

The biofilm may include or be produced by a microorganism that removes a heavy metal such as cadmium, iron, nickel, radium, uranium, cobalt, lead, manganese, zinc, copper, arsenic or combinations thereof. For example, the microorganisms may include at least one of the following: *Deinococcus geothermalis, Deinococcus radiodurans* and combinations thereof. Additional details about suitable reactor vessels and biofilms are described in U.S. Patent Application Publication No. 2010/0319913, the Detailed Description of which is incorporated herein by reference in its entirety. Other vessel structures and biofilms may be used with the system of this disclosure. Anaerobic biofilms may remove materials such as metals (e.g., aluminum, chromium, cobalt, copper, iron, lead, nickel, thallium, vanadium, zinc), non-metals (e.g., selenium), metalloids (e.g., arsenic), radionuclides, sulfates, and other materials from the fluid.

Referring again to FIG. 1, the system may include a precipitation reactor 30. In some embodiments, a surge tank 34, which may be a closed unit or an open facility such as a pond, may be fluidly connected between the columns and the precipitation reactor 30 to hold fluid and balance the flow within the system as needed. The precipitation reactor 30 may be located downstream of the anaerobic columns 10 as shown in FIG. 1, or it may be configured to be positioned upstream of the columns so that it receives fluid after it exits the filter 24. The precipitation reactor 30 may include a tank, pond, or other storage facility in which the water is exposed to one or more reagents to separate divalent metals such as barium and strontium from the fluid. The reagents also may remove calcium and other metals such as manganese, iron, and chromium. Suitable reagents typically include pH modification agents, such as bases (sodium hydroxide or lime) or acids (hydrochloric acid, nitric acid, or sulfuric acid). The pH may be controlled by adding reagent until a pre-determined set point is reached, as measured with a pH meter. The pH set point may be determined as needed based on the chemistry of the fluid to be treated or the original water chemistry. A scale inhibitor may be added to help prevent metals such as barium and strontium from coating the system's pipes. Optionally, a reagent source 32 such as a storage unit may hold additional reagents, which can be introduced into the reactor as needed. Optionally, one or more parameters of the reactor 30 may be monitored so that a user can adjust, or so that a controller can automatically adjust, the flow of reagents into the reactor 30.

A settling facility 40, such as a storage tank or pond, may be positioned downstream of the precipitation reactor and aerobic columns to hold fluid and allow the separated solids (such as the metal sulfides and oxides) to settle out of the fluid. A slurry with some fluid and a relatively high concentration of settled solids may form at the bottom of the settling facility. Coagulants or flocculants may need to be added to the settling vessel 40 to enhance solids settling. A slurry pump 42 may be fluidly connected to an outlet of the settling facility 40 to draw the slurry from the tank and direct it to a filter press 44, such as a plate and frame filter press, to press the solids into a cake. Optionally, multiple filter presses may be connected in parallel as shown in order to allow a higher volume of fluid to be passed through the presses at one time. In addition, parallel filter presses allow filtration of the process stream while another press is offline for cleaning or other maintenance. Fluids from the filter press system 44 may be directed back to the fluid source 20 via a recycle line (such as a pipe or trough) 46 for re-treatment in the anaerobic columns 10.

Fluid from which solids have been settled may be directed from the settling facility 40 to a neutralization reactor 50, and then to an aerobic biofilm system 60. The neutralization reactor 50 may be a tank or pond that holds and/or receives reagents that lower the pH of the fluid so that the fluid does not destroy the biofilm when it enters into the aerobic biofilm system 60. Suitable reagents may include, for example, lime, which may get the fluid to a substantially neutral pH (i.e., a pH of about 7). The neutralization reactor also may introduce an oxidant neutralizer into the fluid. One or more pumps 52 may be fluidly connected between the settling facility and the neutralization reactor and/or the neutralization reactor and the aerobic biofilm system to draw or push fluid through the various devices.

The aerobic biofilm system 60 may include one or more tanks, ponds, or other containers in which an aerobic biofilm grows. An oxygen source, such as an air intake and fan, may direct oxygen-containing gas into the system 60 to promote growth of the aerobic biofilm. A nutrient source also may be provided to introduce nutrients, such as methanol, into the system 60 to promote biofilm growth. Optionally, one or more parameters of the system 60 may be monitored so that a user can adjust, or so that a controller can automatically adjust, the flow of reagents and/or nutrients into the system 60. Parameters to be monitored for control purposes include items such as dissolved oxygen, pH, and ORP. The aerobic biofilm may metabolize, destroy and/or eliminate organic material such as benzene, ethylene glycol, surfactants, phenolics, and residual nutrients in the fluid. Optionally, the aerobic biofilm also may separate any remaining metals (such as manganese, iron), from the fluid.

Output from aerobic reactor may be directed to a desalination facility, an effluent tank 70, or another facility to receive the treated water for re-use or discharge.

Optionally, the sequence of treatment may be varied from that shown in FIG. 1, depending on the properties and chemistry of the fluid to be treated. For example, in some embodiments, the fluid may be treated with the aerobic biofilm system and/or chemical precipitation system before it is treated in the anaerobic biofilm-containing columns. Optionally, multiple sets of anaerobic columns may be placed at different locations in the system so that the fluid is processed more than one time by the columns, such as before and after chemical precipitation.

Optionally, some or all of the features of the system may be positioned on a vehicle 90, such as a truck bed, so that the treatment facility can be moved from place to place. For example, the system may be pre-piped, with bypass valves and multiple pipe connections to allow the facility to be altered as needed. For example, the columns 10 may be connected in a manner that will allow both series and parallel configurations, with valves available to open and close as needed to select the desired one of the available configurations. As another example, multiple filter presses 44 may be connected in parallel, with valves available to take individual presses on or off line based on the desired throughput. In addition, a power source, such as a battery or solar energy source, may be included on the vehicle to power the system.

Figure 3:
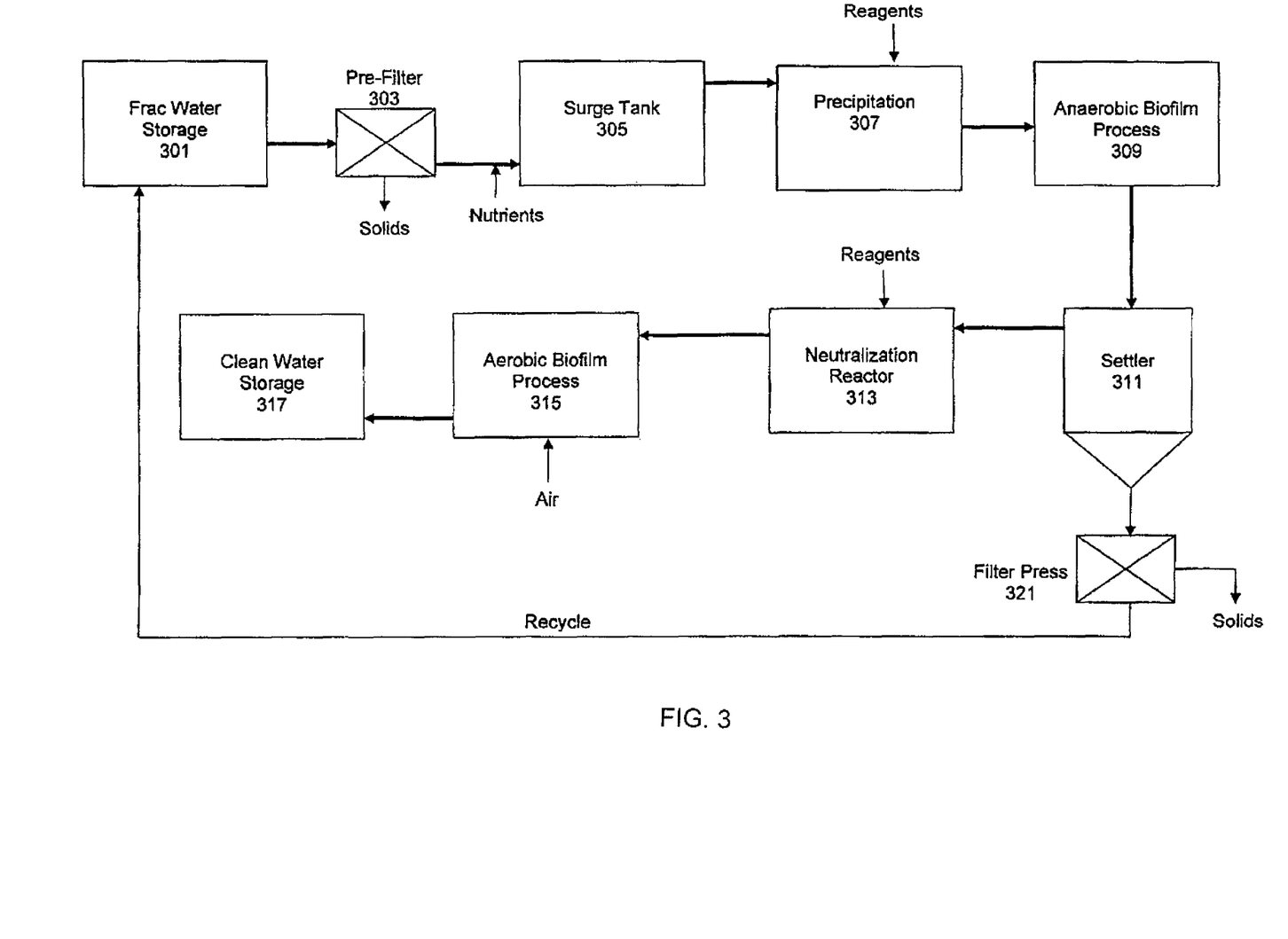
FIG. 3 illustrates a process of treating fluids in a fluid treatment system.

FIG. 3 illustrates various steps in a method of treating frac water according to various embodiments. A method of treating fluid such as frac fluid or wastewater includes pumping or otherwise delivering the fluid from a storage facility 301 into a processing system. The fluid may initially pass into a filter 303 to remove large solids. The fluid may be processed in an anaerobic reactor 309 containing a biofilm, in the absence of oxygen. As the fluid passes over or through the biofilm in the columns, the biofilm removes metals and/or other contaminants from the fluid. Before or after the anaerobic biofilm process, the fluid may be held in a surge tank 305 and processed in a precipitation reactor 307, where it is exposed to a reagent that separates calcium, strontium, barium and/or other materials from the fluid. The fluid exits the reactor and is held in a settling facility 311 where the heavy materials (e.g., calcium, strontium, barium) settle into a slurry. The slurry may be pressed in a filter press 321 so that solids stay together and any remaining fluid can be recycled back into the start of the process for further treatment. The fluid exiting the settling facility can then be processed by an aerobic biofilm 315 therein to remove organic material from the fluid. Optionally, before entering the aerobic treatment system, the fluid may be is treated with a reagent to neutralize its pH 313. After aerobic processing, the clean water may be stored 317 for later use.

It is to be understood that any or all of the steps listed above may be performed in a different order, depending on the properties and chemistry of the water to be treated. For example, if barium and strontium concentrations are not very high or their removal is not necessary, the precipitation step may be scaled back or eliminated accordingly.

Figure 4:
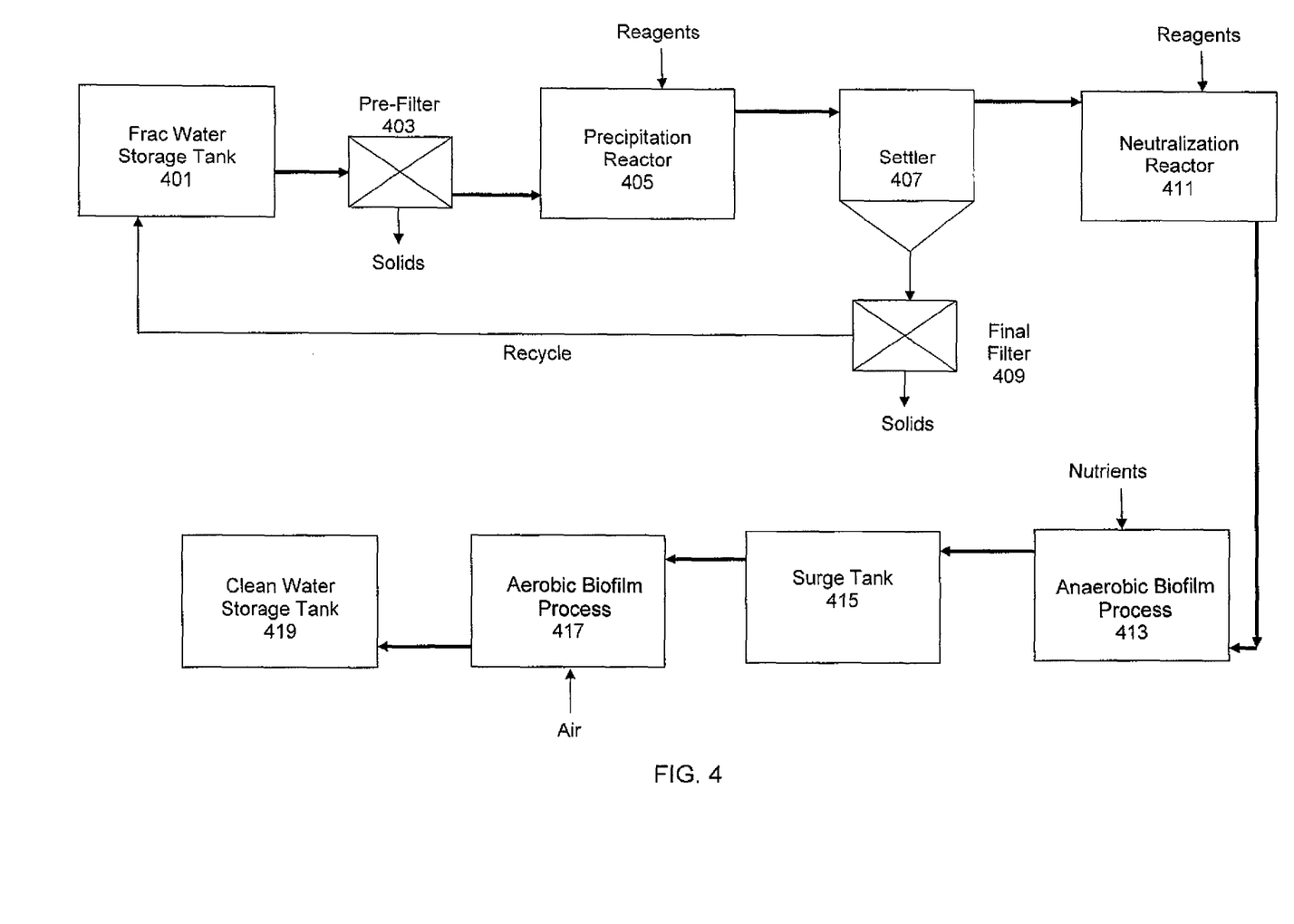
FIG. 4 illustrates an alternative process of treating fluids in a fluid treatment system.

FIG. 4 illustrates various steps in an alternative method of treating frac water according to various embodiments. A method of treating fluid such as frac fluid or wastewater includes pumping or otherwise delivering the fluid from a storage facility 401 into a processing system. The fluid may initially pass into a filter 403 by way of conventional means for the removal of large solids and sediment. This may include the use of bag or cartridge filters. The cleaning of the filters may be controlled by measuring differential pressure across the filter. Following filtration of the fluid, the fluid may be exposed to reagents in a precipitation reactor 405 to precipitate barium, strontium, and to a lesser extent, calcium. The primary precipitant includes a sulfate salt, such as sodium sulfate. The pH of the fluid may be adjusted as necessary to enhance precipitation. The addition of sulfate may be either in a solid or liquid form. The rate of the solid feeder or chemical feed pump may be controlled by the turbidity of the liquid in the mixed precipitation reactor. The pH of the solution may be adjusted by adding either an acid or base with a chemical feed pump and may be controlled by a pH feedback controller in the reactor. The fluid exits the precipitation reactor 405 and is held in a settling facility 407 where the heavy materials (e.g., calcium, strontium, barium) settle into a slurry. A conical gravity separation facility is preferably used in which the decant water may overflow the settling facility 407. A filter press or presses 409 may be used to separate the solids produced during the precipitation process and any remaining fluid can be recycled back into the start of the process for further treatment. The cleaning of the filter press may be controlled by measuring differential pressure across the filter.

The fluid exiting the settling facility 407 can then be processed in a neutralization reactor 411 by modifying the pH and oxidation-reduction potential (ORP). Reagents may be added with chemical feed pumps in response to pH and ORP measurements in the mixed reactor 411. For example, a low pH will cause a chemical feed pump to inject caustic or lime slurry into the reactor until the pH of the solution is nearly neutral (i.e., about 7). Following treatment in the neutralization reactor 411, the fluid can then be processed in an anaerobic biofilm reactor or column 413 for the removal of heavy metals, radionuclides, and some organic substances. Multiple anaerobic biofilm columns 413 may be used in series in an upflow configuration. Gases produced by the bacterial processes may be carried through multiple reactors and vented in the final unit. The anaerobic biofilm columns 413 can be maintained in the anaerobic state by the absence of oxygen. The rate of nutrient feed to the columns 413 may be proportional to the amount of liquid input. After treatment in the anaerobic biofilm column 413, the fluid may be held in a surge tank 415 and then processed in an aerobic biofilm reactor or column 417 for the removal of excess nutrients and other organic substances. The aerobic biofilm process may include trickling bed configuration using either passive or forced aeration. The amount of aeration may be controlled by the dissolved oxygen level of the effluent. After aerobic processing, the clean water may be stored 419 for later use.

It is to be understood that any or all of the steps listed above may be performed in a different order, depending on the properties and chemistry of the water to be treated. For example, if barium and strontium concentrations are not very high or their removal is not necessary, the precipitation step may be scaled back or eliminated accordingly.

Waste fluids in other industries, such as any type of wastewater, may also benefit from the treatment systems described in this disclosure. For example, the methods and systems described in this document may be used to treat acid rock drainage, hospital wastewater, other industrial wastewater, stormwater runoff, or other fluids.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A fluid treatment system, comprising:
   a fluid source that supplies hydraulic fracturing fluid;
   an anaerobic reactor comprising an intake port that is fluidly connected to the fluid source, an outlet port, and a plurality of biofilm retaining structures that are at least partially coated with an anaerobic biofilm;
   an aerobic reactor comprising an intake port that is fluidly connected with the outlet port of the anaerobic reactor, wherein the aerobic reactor also comprises an aerobic biofilm; and
   a settling facility that is configured to receive the fluid from the anaerobic reactor and separate metals from the fluid before the fluid is passed to the aerobic reactor.

2. The system of claim 1, further comprising:
   a precipitation reactor comprising a vessel and a reagent, wherein the vessel is configured to receive the fluid so that the reagent may separate one or more divalent metals from the fluid.

3. The system of claim 2, wherein the precipitation reactor is configured to be positioned downstream of the fluid source and upstream of the anaerobic reactor.

4. The system of claim 2, wherein the precipitation reactor is configured to be positioned downstream of the anaerobic reactor and upstream of the aerobic reactor.

5. The system of claim 2, wherein the precipitation reactor is configured to be positioned upstream of the anaerobic reactor and the aerobic reactor.

6. The system of claim 2, further comprising a vehicle that is configured to transport the aerobic reactor, the precipitation reactor, and the anaerobic reactor and to enable the system to be operated while positioned on the vehicle.

7. The system of claim 2, further comprising a settling facility that is configured to receive the fluid from the precipitation reactor and separate metals from the fluid before the fluid is passed to the anaerobic reactor.

8. The system of claim 1, further comprising a neutralization reactor configured to be in fluid connection with the intake port of the aerobic reactor, the neutralization reactor comprising a vessel and a reagent that, upon receipt of the fluid, modifies the fluid to a substantially neutral pH.

9. The system of claim 1, further comprising a neutralization reactor configured to be in fluid connection with the intake port of the anaerobic reactor, the neutralization reactor comprising a vessel and a reagent that, upon receipt of the fluid, modifies the fluid to a substantially neutral pH.

10. The system of claim 1, wherein the anaerobic reactor comprises a plurality of columns connected to each other in series, and the anaerobic biofilm comprises one or more of the following: *Deinococcus geothermalis, Deinococcus radiodurans*.

11. The system of claim 1, wherein the anaerobic reactor comprises a plurality of columns connected to each other in parallel, and the anaerobic biofilm comprises one or more of the following: *Deinococcus geothermalis, Deinococcus radiodurans*.

12. A fluid treatment system, comprising:
   a fluid source that supplies a fluid;
   a precipitation reactor comprising a vessel and a reagent, wherein when the vessel is configured to receive the fluid so that the reagent may separate one or more divalent metals from the fluid;
   an anaerobic reactor comprising an intake port that is fluidly connected to the fluid source, an outlet port, and a plurality of biofilm retaining structures that are at least partially coated with an anaerobic biofilm;
   an aerobic reactor comprising an intake port that is fluidly connected with the outlet port of the anaerobic reactor, wherein the aerobic reactor also comprises an aerobic biofilm;
   a settling facility that is configured to receive the fluid from the anaerobic reactor and separate metals from the fluid before the fluid is passed to the aerobic reactor;
   a neutralization reactor configured to be in fluid connection with the intake port of the aerobic reactor, the neutralization reactor comprising a vessel and a reagent that, upon receipt of the fluid, modifies the fluid to a substantially neutral pH;
   wherein the anaerobic reactor comprises a plurality of columns, each of which contains the anaerobic biofilm, which comprises one or more of the following: *Deinococcus geothermalis, Deinococcus radiodurans*; and
   the aerobic reactor comprises an oxygen source and a nutrient source.

13. The system of claim 12, further comprising a vehicle that is configured to transport the aerobic reactor, the precipitation reactor, and the anaerobic reactor and to enable the system to be operated while positioned on the vehicle.

14. A fluid treatment system, comprising:

a fluid source that supplies a fluid;

a precipitation reactor comprising a vessel and a reagent, wherein when the vessel is configured to receive the fluid so that the reagent may separate one or more divalent metals from the fluid;

a settling facility that is configured to receive the fluid from the precipitation reactor and separate metals from the fluid;

a neutralization reactor that is configured to be in fluid connection with an intake port of an anaerobic reactor, the neutralization reactor comprising a vessel and a reagent that, upon receipt of the fluid, modifies the fluid to a substantially neutral pH;

wherein the anaerobic reactor is fluidly connected to the neutralization reactor and a plurality of biofilm retaining structures that are at least partially coated with an anaerobic biofilm for the removal of one or more heavy metals, radionuclides, and organic materials from the fluid; and a surge tank that is configured to receive the fluid from the anaerobic reactor and is fluidly connected to an aerobic reactor, the aerobic reactor comprising an aerobic biofilm for the removal of excess nutrients and one or more organic materials from the fluid.

15. The system of claim 14, wherein:

the anaerobic reactor comprises a plurality of columns connected in series, each of which contains the anaerobic biofilm, which comprises one or more of the following: *Deinococcus geothermalis, Deinococcus radiodurans*; and the aerobic reactor comprises an oxygen source and a nutrient source.

16. A method of treating hydraulic fracturing fluid, comprising:

exposing hydraulic fracturing fluid to a reagent in a precipitation reactor to precipitate one or more divalent metals from the fluid;

passing the fluid through an anaerobic reactor comprising a plurality of biofilm retaining structures that are at least partially coated with an anaerobic biofilm that removes one or more metals from the fluid;

holding the fluid in a surge tank; and passing the fluid through an aerobic reactor comprising an aerobic biofilm that removes one or more organic materials from the fluid.

17. The method of claim 16, further comprising, after exposing the fluid to the precipitation reactor, settling the metals from the fluid in a settling facility.

18. The method of claim 16, further comprising, before passing the fluid through the aerobic reactor, adding reagent that modifies the fluid to a substantially neutral pH in a neutralization reactor.

19. The method of claim 16, further comprising, before passing the fluid through the anaerobic reactor, adding reagent that modifies the fluid to a substantially neutral pH in a neutralization reactor.

\* \* \* \* \*